(12) United States Patent
Senthil

(10) Patent No.: US 7,653,621 B2
(45) Date of Patent: Jan. 26, 2010

(54) METHOD OF DETERMINING THE SIMILARITY OF TWO STRINGS

(75) Inventor: Muthu Senthil, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 363 days.

(21) Appl. No.: 10/632,190

(22) Filed: Jul. 30, 2003

(65) Prior Publication Data

US 2009/0049028 A1 Feb. 19, 2009

(51) Int. Cl.
G06F 17/30 (2006.01)
(52) U.S. Cl. .......................................... 707/5; 715/816
(58) Field of Classification Search ................. 707/3–6; 715/816; 713/200–201
See application file for complete search history.

(56) References Cited

U.S. PATENT DOCUMENTS

| 6,240,409 | B1 * | 5/2001 | Aiken ............................ 707/4 |
|---|---|---|---|
| 6,697,844 | B1 * | 2/2004 | Chan et al. ................... 709/206 |
| 6,735,703 | B1 * | 5/2004 | Kilpatrick et al. .............. 726/23 |
| 6,742,124 | B1 * | 5/2004 | Kilpatrick et al. .............. 726/23 |
| 7,043,426 | B2 * | 5/2006 | Roberge et al. ............. 704/231 |
| 2002/0156760 | A1 * | 10/2002 | Lawrence et al. ............... 707/1 |
| 2003/0004716 | A1 * | 1/2003 | Haigh et al. ................. 704/238 |
| 2004/0243501 | A1 * | 12/2004 | Duffey, Jr. ................... 715/513 |

OTHER PUBLICATIONS

Gilleland, et al. *Levenshtein Distance, In Three Flavors* http://www.merriampark.com/id.htm.

* cited by examiner

*Primary Examiner*—Sathyanarayan Pannala
(74) *Attorney, Agent, or Firm*—Townsend and Townsend and Crew LLP

(57) ABSTRACT

Embodiments of the present invention provide a method of determining the similarity of two strings. The method comprises calculating a Levenshtein matrix of a first string and a second string. A Levenshtein distance is determined from the Levenshtein matrix. A largest common substring is also determined from the Levenshtein matrix. The method may farther comprise determining a numerical score as a function of the Levenshtein distance and the largest common substring.

15 Claims, 13 Drawing Sheets

|   |   | W | I | D | G | E | T |   | I | N | C | — 230 |
|---|---|---|---|---|---|---|---|---|---|---|---|---|
|   | 0 | 1 | 2 | 3 | 4 | 5 | 6 | 7 | 8 | 9 | 10 | — 240 |
| A | 1 | 1 | 2 | 3 | 4 | 5 | 6 | 7 | 8 | 9 | 10 |   |
| C | 2 | 2 | 2 | 3 | 4 | 5 | 6 | 7 | 8 | 9 | 9 |   |
| M | 3 | 3 | 3 | 3 | 4 | 5 | 6 | 7 | 8 | 9 | 10 |   |
| E | 4 | 4 | 4 | 4 | 4 | 4 | 5 | 6 | 7 | 8 | 9 |   |
|   | 5 | 5 | 5 | 5 | 5 | 5 | 5 | 5 | 6 | 7 | 8 |   |
| W | 6 | 5 | 6 | 6 | 6 | 6 | 6 | 6 | 6 | 7 | 8 |   |
| I | 7 | 6 | 5 | 6 | 7 | 7 | 7 | 7 | 6 | 7 | 8 |   |
| D | 8 | 7 | 6 | 5 | 6 | 7 | 8 | 8 | 7 | 7 | 8 |   |
| G | 9 | 8 | 7 | 6 | 5 | 6 | 7 | 8 | 8 | 8 | 8 |   |
| E | 10 | 9 | 8 | 7 | 6 | 5 | 6 | 7 | 8 | 9 | 9 |   |
| T | 11 | 10 | 9 | 8 | 7 | 6 | 5 | 6 | 7 | 8 | 9 |   |
|   | 12 | 11 | 10 | 9 | 8 | 7 | 6 | 5 | 6 | 7 | 8 |   |
| C | 13 | 12 | 11 | 10 | 9 | 8 | 7 | 6 | 6 | 7 | 7 |   |
| O | 14 | 13 | 12 | 11 | 10 | 9 | 8 | 7 | 7 | 7 | ⑧ | — 250 |

|   | | W | I | D | G | E | T |   | I | N | C |
|---|---|---|---|---|---|---|---|---|---|---|---|
|   | 0 | 1 | 2 | 3 | 4 | 5 | 6 | 7 | 8 | 9 | 10 |
| A | 1 | 1 | 2 | 3 | 4 | 5 | 6 | 7 | 8 | 9 | 10 |
| C | 2 | 2 | 2 | 3 | 4 | 5 | 6 | 7 | 8 | 9 | 9 |
| M | 3 | 3 | 3 | 3 | 4 | 5 | 6 | 7 | 8 | 9 | 10 |
| E | 4 | 4 | 4 | 4 | 4 | 4 | 5 | 6 | 7 | 8 | 9 |
|   | 5 | 5 | 5 | 5 | 5 | 5 | 5 | 5 | 6 | 7 | 8 |
| W | 6 | 5 | 6 | 6 | 6 | 6 | 6 | 6 | 6 | 7 | 8 |
| I | 7 | 6 | 5 | 6 | 7 | 7 | 7 | 7 | 6 | 7 | 8 |
| D | 8 | 7 | 6 | 5 | 6 | 7 | 8 | 8 | 7 | 7 | 8 |
| G | 9 | 8 | 7 | 6 | 5 | 6 | 7 | 8 | 8 | 8 | 8 |
| E | 10 | 9 | 8 | 7 | 6 | 5 | 6 | 7 | 8 | 9 | 9 |
| T | 11 | 10 | 9 | 8 | 7 | 6 | 5 | 6 | 7 | 8 | 9 |
|   | 12 | 11 | 10 | 9 | 8 | 7 | 6 | 5 | 6 | 7 | 8 |
| C | 13 | 12 | 11 | 10 | 9 | 8 | 7 | 6 | 6 | 7 | 7 |
| O | 14 | 13 | 12 | 11 | 10 | 9 | 8 | 7 | 7 | 7 | 8 |

```
/**
 * This function computes the Levenshtein distance of two strings
 *
 * @param s the first string
 * @param t the second string
 * @param n length of s
 * @param m length of t
 * @return Levenshtein distance of s and t
 */
public static int levenshteinComputations(String s,
                   String t,
                   int n,
                   int m) { int i;                  // iterates through s
    int j;                  // iterates through t
    int k;                  // used to initialize s and t
    char s_i;               // ith character of s
    int jNext;
    int iNext;
    int prevJVal;
    int startAt = 0;
    int a, b, c, temp;
    boolean substringBroken = false;

// Levenshtein matrix
    //int[][] levenshteinDist = returnInitMatrix(n+1, m+1);

// Step 1 (takes care of a null string)
    if ((n == 0) || (m == 0)) {
        levenshteinDist[n][m] = (n == 0)?m:n;
        return 0;
    }

// Step 1.5 (eliminate the common initial string in the strings)
    temp = (m < n)?m:n;
    for (i = 0; (i < temp) && !substringBroken; i++) {
        if (s.charAt(i) != t.charAt(i)) {
            startAt = i;
            substringBroken = true;
        }
    } if (!substringBroken && i == temp) {
        startAt = temp;
        // Return immediately if one string is completely contained in
        // the other.
        levenshteinDist[n][m] = (m > n)?(m - n):(n - m);
        return startAt;
    }
```

FIGURE 4A

```
// Step 2 (initialize the elements of the matrix)
for (k = 0, i = startAt; i <= n; i++)
    levenshteinDist[i][startAt] = k++;

for (k = 0, j = startAt; j < m; j++) {
    levenshteinDist[startAt][j] = k++;
    tBuffer[j] = t.charAt(j);
}
levenshteinDist[startAt][m] = k;

// Step 3 (perform the computation)
for (i = startAt; i < n;) {
    s_i = s.charAt(i);
    iNext = i+1;

// optimization: minimize array references by setting the
    // temporary variable prevJVal.  Set the previous j value to the
    // value at levenshtein[iNext][startAt] in order to initialize it.
    // (see initialization at Step 2)
    prevJVal = levenshteinDist[iNext][startAt];

// Step 4
    for (j = startAt; j < m;) {
        jNext = j+1;
        a = levenshteinDist[i][jNext]+1;

// b = levenshteinDist[iNext][j]+1;
        b = prevJVal+1;

// Step 5
        c = (s_i == tBuffer[j])?levenshteinDist[i][j]:levenshteinDist[i][j]+1;

// Step 6
        temp = (a < b)?a:b;
        levenshteinDist[iNext][jNext] = prevJVal = (c < temp)?c:temp;
        j = jNext;
    } i = iNext;
}

// Step 7 (return the levenshtein matrix and the starting position)

return startAt;
}
```

FIGURE 4B

```
/**
 * This function computes the largest common substring score of two strings
 *
 * @param s the first string
 * @param t the second string
 */ prevString1 = s;
prevString2 = t;

previousLevScore = 1 - (((float) (distance << 1))/
            ((float) (lengthS + lengthT)));

returnVal += previousLevScore;

if (!largeLengthDiff) {

// Calculate the substring score if this is the case
    if (returnVal > 0 && returnVal < maxScore) {
        int currMaxLength = 0;
        int k, l;
        int currIteration;
        int d1;
        int d1_length;
        int d2;

// Loop through the rows, then the columns
        for (k = startAt; k <= lengthS; k++) {
            currIteration = k;
            d1 = 0;
            d1_length = 0;

for (l = startAt;
                (l <= lengthT) && (currIteration <= lengthS);
                l++) {
                d2 = levenshteinDist[currIteration][l];

if (d1 == d2)
                    d1_length++;
                else
                    d1_length = 1;

d1 = d2;

currIteration++;
            } if (d1_length > currMaxLength)
                currMaxLength = d1_length;
        }
```

FIGURE 4C

```
// Loop through the columns then the rows
for (l = startAt; l <= lengthT; l++) {
  currIteration = l;
  d1 = 0;
  d1_length = 0;

for (k = startAt;
      (k <= lengthS) && (currIteration <= lengthT);
      k++) {
    d2 = levenshteinDist[k][currIteration];

if (d1 == d2)
       d1_length++;
    else
       d1_length = 1;

d1 = d2;

currIteration++;
  }
  if (d1_length > currMaxLength)
     currMaxLength = d1_length;
}

// Make sure that the matching substring is not the
// initial match
if (startAt > currMaxLength) {
   currMaxLength = startAt;
} else {
   currMaxLength--;
}
```

FIGURE 4D

```
/**
 * Takes two strings and gets a score based on their acronyms
 *
 * @param str1 first string
 * @param str2 second string
 * @param m the multipliers to return
 * @return the score of comparison between the acronyms
 */
public static float scoreAcronyms(String str1,
                    String str2,
                    float partialMatch,
                    float exactMatch) {
   int acr1Length = 1;
   int acr2Length = 1;
   int str1Length = str1.length();
   int str2Length = str2.length();
   int minLength, i;

if (str1 == null || str2 == null) {
      return 0;
   }

// get the acronym representation of string 1
   acr1[0] = str1.charAt(0);
   for (i = 1; i < str1Length; i++) {
      if (str1.charAt(i) == ' ' && (++i) < str1Length)
         acr1[acr1Length++] = str1.charAt(i);
   }

// if there is only one word, copy the entire string into the acronym
   if (acr1Length == 1) {
      for (i = 1; i < str1Length; i++) {
         acr1[acr1Length++] = str1.charAt(i);
      }
   }

// get the acronym representation of string 2
   acr2[0] = str2.charAt(0);
   for (i = 1; i < str2Length; i++) {
      if (str2.charAt(i) == ' ' && (++i) < str2Length)
         acr2[acr2Length++] = str2.charAt(i);
   }

// if there is only one word, copy the entire string into the acronym
   // this allows us to match already-acronymized names to non-acronymized
   // strings (e.g., ge = general electric)
   if (acr2Length == 1) {
      for (i = 1; i < str2Length; i++) {
         acr2[acr2Length++] = str2.charAt(i);
      }
   }
```

FIGURE 4E

```
// see how equal the acronyms are.
minLength = (acr1Length > acr2Length)?acr2Length:acr1Length;
for (i = 0; (i < minLength) && (acr1[i] == acr2[i]); i++) {}

// give the acronyms a non-zero score only if the loop above completed.
if (i == minLength)
    return (acr1Length == acr2Length)?exactMatch:partialMatch;
else
    return 0;
}
```

FIGURE 4F

```
/**
 * Returns a consolidated Levenshtein, Substring, and Acronymn score
 *
 * @param s the first string
 * @param t the second string
 * @param maxScore the maximum allowable returnable score
 * @param m the multipliers to use
 * @return the consolidated score of both these substrings
 */
public static float consolidatedScore(String s,
                    String t,
                    float maxScore) {
  float returnVal = 0;

// If the strings are equal, we are done, just return the max score
  if (s.equals(t))
      return maxScore;
  else {
      // Previous strings have been cached to save computations
      if (prevString1.equals(s) && prevString2.equals(t)) {
        returnVal = maxScore;
      } else {
        // Set the lengths we're going to use for computations.
        int distance;
        int lengthS = s.length();
        int lengthT = t.length();
        int longerLength = (lengthS > lengthT)?lengthS:lengthT;
        int shorterLength = (lengthS > lengthT)?lengthT:lengthS;
        int startAt;
        boolean largeLengthDiff;

// If the lowest among top 25 scores is less than 0, then see
        // if we can just approximate the levenshtein distance
        if (largeLengthDiff = (longerLength > (shorterLength << 2))) {
            distance = longerLength - shorterLength + 1;
            startAt = 0;
        } else {
            startAt = levenshteinComputations(s,
                        t,
                        lengthS,
                        lengthT);

distance = levenshteinDist[lengthS][lengthT];
        }
```

FIGURE 4G

```
            // Compute and scale the substring score, add it to the
            // returned value.
            returnVal += (((float) currMaxLength) /
                    ((float) ((lengthS > lengthT)?lengthS:lengthT)));

}
        }
    }
    // Scale down because both Levenshtein and Substring are out of one
    returnVal *= 0.5;
    return returnVal;
    }
}
```

FIGURE 4H

METHOD OF DETERMINING THE SIMILARITY OF TWO STRINGS

FIELD OF THE INVENTION

Embodiments of the present invention relate to data processing, and more particularly to determining a similarity between two strings.

BACKGROUND OF THE INVENTION

Legacy computer implemented data processing systems and methods generally required strict matching of equivalent data values. For example, an accounting application includes a database wherein account receivables are logged. Each record may comprise a plurality of fields, such as the name of the enterprise, the date billed, the amount due, the date paid and the amount of payment. A given payment may be received from Widget Inc. in the amount of $500. A given record in the accounting system may contain a record for Acme Widget Co. with an amount due of $723. In early legacy data processing systems and methods, if the data did not exactly match, entry of payment could not be automated. Accordingly an individual would be needed to match the data associated with the received payment to the appropriate record in the accounting system, and thereafter update the record.

As methods of data processing progress, it is desired that the systems and methods are more tolerant of variations between equivalent data values. Accordingly, it is desired that data processing methods and systems are capable of determining a similarity between two strings (e.g., fuzzy string matching). One method of determining a similarity between two strings comprises the Levenshtein distance (LEV) heuristic. The Levenshtein heuristic produces a matrix of hamming distances, which provides a measure of the similarity of the two strings. Another method of determining a similarity between two strings comprises the largest common substring (LCS) heuristic. Accordingly, recent data processing systems and methods, which utilize such a heuristic, can provide some ability to match strings. For example, the payment received from Widget Inc. may be matched to the accounts receivable record for Acme Widget Co. Therefore, some automation of data entry, processing and reporting can be achieved in conventional art data processing systems and methods.

Given two strings of length M and N, respectively, the Levenshtein heuristic is calculated in M times N (M×N) calculations. Similarly, the largest common substring heuristic is calculated in M time N (M×N) calculations. Accordingly, legacy string matching heuristics incur significant processing costs. Thus, string matching heuristics which provide increased string matching capabilities while minimizing computational costs are sought in the data processing arts.

SUMMARY OF THE INVENTION

Embodiments of the present invention provide a method of determining a similarity of a two string. The method comprises calculating a Levenshtein matrix of a first string and a second string. A Levenshtein distance is determined from the Levenshtein matrix. A largest common substring is also determined from the Levenshtein matrix.

Embodiments of the present invention may further comprise calculating a Levenshtein score from the Levenshtein distance and the length of the two strings, and calculating largest common substring score from the length of the largest common substring and the length of the two strings. In addition, the method may also comprise calculating an acronym score. The acronym score may be utilized to reduce false positive determinations, by the Levenshtein heuristic and/or the largest common substring heuristic, that two given strings are similar.

Embodiments of the present invention may further comprise determining one or more numerical scores as a function of the Levenshtein distance and the largest common substring. A first numeric score may be calculated as a sum of a weighted Levenshtein score and a weighted largest common substring score. A second numeric score may be calculated as a sum of a weighted acronym score and the first numeric score. Embodiments of the present invention may further comprise utilizing the first numeric score for determining the similarity between the two strings, when both strings are numeric-type strings. Alternatively, the second numeric score may be utilized for determining the similarity, when one or both strings are character-type strings.

Embodiments of the present invention advantageously combine the Levenshtein distance heuristic and the largest common substring heuristic to reduce the number of computations performed to obtain both heuristics. Accordingly, the total run time of computer implemented embodiments of the present invention is reduced by approximate one half, as compared to calculating the Levenshtein distance heuristic and the largest common substring heuristic separately according to the conventional art.

BRIEF DESCRIPTION OF THE DRAWINGS

The present invention is illustrated by way of example and not by way of limitation, in the figures of the accompanying drawings and in which like reference numerals refer to similar elements and in which:

FIGS. 2A-2B show an exemplary Levenshtein matrix, in accordance with one embodiment of the invention.

FIGS. 4A-4H show an exemplary computer implemented method of determining a similarity of a first string and a second string, in accordance with an exemplary embodiment of the invention.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
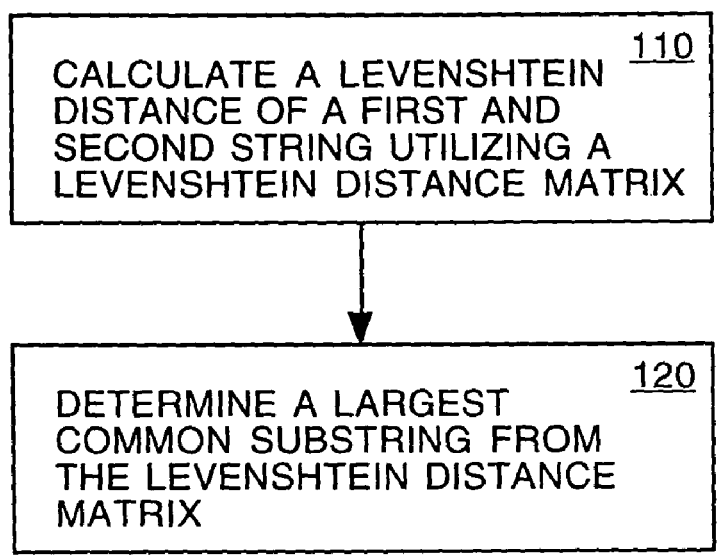
FIG. 1 shows a method of determining a similarity between a first string and a second string, in accordance with one embodiment of the invention.

Referring to FIG. 1, a method of determining a similarity between a first string and a second string (e.g., fuzzy string matching), in accordance with one embodiment of the invention, is shown. As depicted in FIG. 1, the method begins with calculating a Levenshtein distance, at 110. The Levenshtein distance is determined by calculating a Levenshtein matrix. If the first string (S1) has a length of m and the second string (S2) has a length of n, the elements of the Levenshtein matrix D can be calculated in accordance with Equation 1, as follows:

$$D[i,j] = \text{minimum of } (D[i-1,j]+1, D[i,j-1]+1, \text{ or } D[i-1,j-1]+\text{cost}) \qquad (1)$$

Where i=1 to n, j=1 to m, element [0,j]=j, element [i,0]=i, and element [0,0]=0. In one implementation, the cost is 0 if S1[i]=S2[j], and 1 if S1[i]≠S2[j]. The Levenshtein distance is specified by element D[m,n] As a heuristic, the greater the Levenshtein distance, D[m,n], the greater the difference is between the two strings.

Referring now to FIGS. 2A-2B, an exemplary Levenshtein matrix, in accordance with one embodiment of the invention, is shown. As depicted in FIG. 2A, the exemplary Levenshtein matrix is calculated for a first string "Acme Widget Co" and a second string "Widget Inc". For illustrative purposes the first string 210 is shown on the left side of the Levenshtein distance matrix along with the corresponding values of i 220. The second string 230 is shown on top of the Levenshtein distance matrix along with the corresponding values of j 240. The hamming distances in the Levenshtein matrix are calculated according to Equation 1. Accordingly, the Levenshtein distance, D[14,10], is equal to eight (8) 250.

Referring again to FIG. 1, the method further comprises determining a largest common substring from the Levenshtein matrix, at 120. When calculating the hamming distances of the Levenshtein matrix, a common substring does not involve an insertion, deletion, transposition or the like, and therefore no cost is incurred. Thus, the Levenshtein matrix indirectly contains the largest common substring. Accordingly, the largest common substring is identified by determining the longest diagonal of equal hamming distances of lowest value.

As depicted in FIG. 2B, the exemplary Levenshtein matrix is shown with the largest common substring denoted 260. The largest common substring is identified by longest diagonal of equal hamming distances of lowest value.

Figure 3:
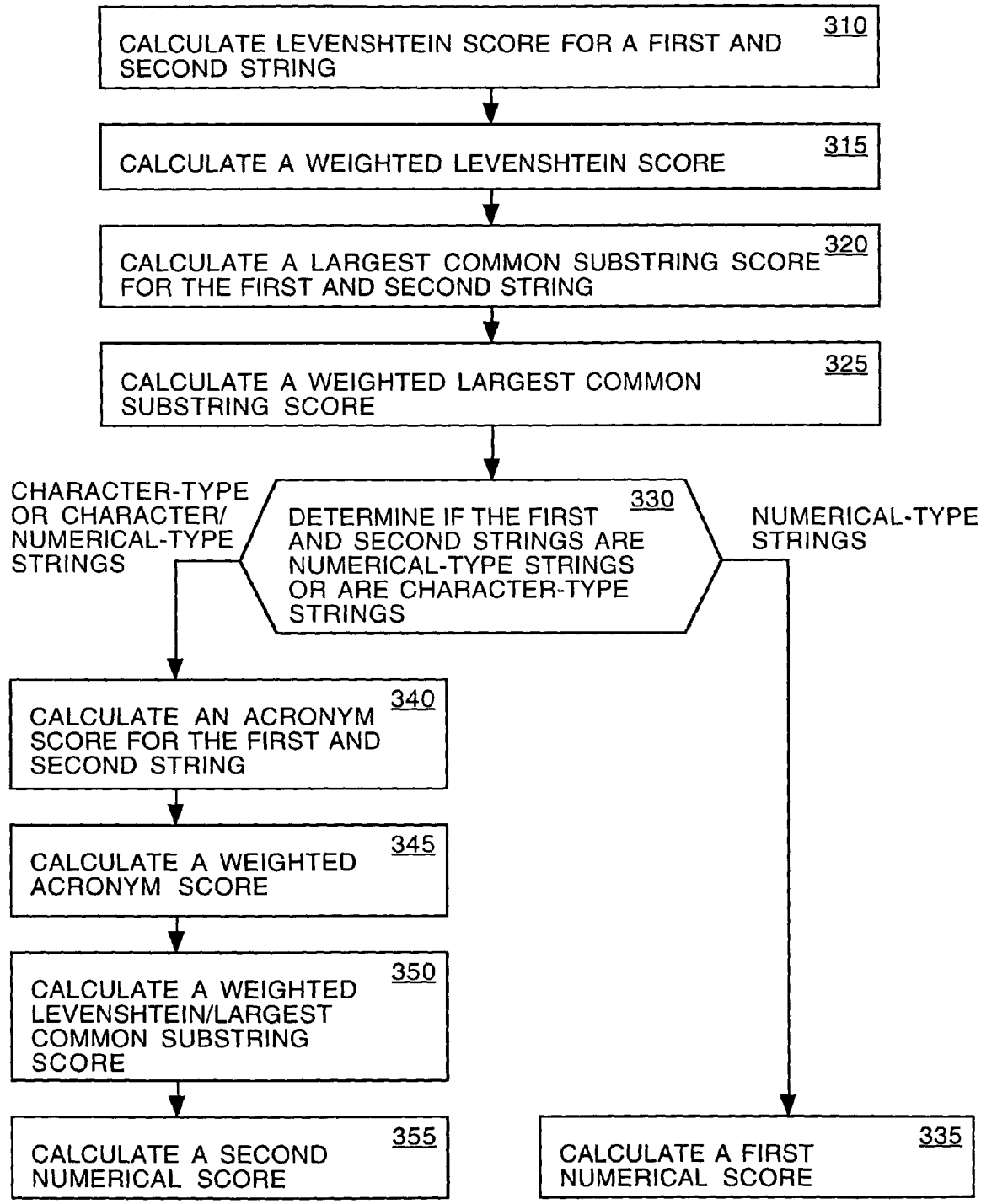
FIG. 3 shows a method of determining a numerical score representing a similarity between a first string and a second string, in accordance with one embodiment of the invention.

Referring now to FIG. 3, a method of determining a numerical score representing a similarity between a first string and a second string, in accordance with one embodiment of the invention, is shown. As depicted in FIG. 3, the method begins with calculating a Levenshtein score, $S_{LEV}$, for the first string and the second string, at 310. The Levenshtein score, $S_{LEV}$, is calculated in accordance with Equation 2, as follows:

$$S_{LEV} = 1 - ((2*D[m,n])/(m+n)) \qquad (2)$$

Wherein the Levenshtein score, $S_{LEV}$, comprises one minus, a product of two (2) and the Levenshtein distance, D[m,n], divided by the sum of the string lengths, (m+n). In one implementation, the Levenshtein distance is determined by calculating a Levenshtein matrix of the first and second strings, as described above. However, any method of determining the Levenshtein distance may also be utilized for calculating the Levenshtein score.

At 315, a weighted Levenshtein score, $WS_{LEV}$, is calculated in accordance with Equation 3, as follows:

$$WS_{LEV} = W_{LEV} * S_{LEV} \qquad (3)$$

Wherein the weighted Levenshtein score, $WS_{LEV}$, comprises a product of the Levenshtein score ($S_{LEV}$) and a Levenshtein weight factor, $W_{LEV}$. In one implementation, the Levenshtein weight factor, $W_{LEV}$, is substantially between 0.3 and 0.7, with an exemplary value of 0.5.

At 320, a largest common substring score, $S_{LCS}$, of the first string and the second string is calculated. The largest common substring score, $S_{LCS}$, is calculated in accordance with Equation 4, as follows:

$$S_{LCS} = (2*\text{Length of Largest Common Substring})/(m+n) \qquad (4)$$

Wherein the largest common substring score, $S_{LCS}$, comprises a product of two (2) and the length of the largest common substring divided by the sum of the string lengths, (m+n). In one implementation, the length of largest common substring is determined from the Levenshtein distance matrix. The longest diagonal of lowest hamming distances in the Levenshtein matrix identifies the largest common substring. However, any method of determining the largest common substring may also be utilized for calculating the length of the largest common substring score.

At 325, a weighted largest common substring score, $WS_{LCS}$, is calculated in accordance with Equation 6, as follows:

$$WS_{LCS} = W_{LCS} * S_{LCS} \qquad (6)$$

Wherein the weighted largest common substring score, $WS_{LCS}$, comprises a product of the largest common substring score, $S_{LCS}$, and a largest common substring weight factor, $W_{LCS}$. In one implementation, the largest common substring weight factor, $W_{LCS}$, is substantially between 0.3 and 0.7, with an exemplary value of 0.5. In one implementation, a sum of the Levenshtein weight factor, $W_{LEV}$, and largest common substring weight factor, $W_{LCS}$, is set equal to one (1).

In some data processing applications, it may be more likely that character transpositions and omissions have occurred when evaluating the similarity of two strings, such as two strings of numerical data. The largest common substring score is adapted to provide a greater indication of a similarity between two strings when transposition, omissions and the like are typical of the type of strings being compared. Accordingly, the largest common substring weight factor may be increased if the two strings are more likely to contain transpositions, omission and the like. In other data processing applications, it may be more likely that a misspelling or entirely different representation of the data have occurred when evaluating the similarity of two strings, such as two strings of character data. The Levenshtein score is adapted to provide a greater indication of a similarity between two strings in which misspelling or entirely different representations are typical of the type of strings being compared. Accordingly, the Levenshtein weight factor may be increased if the two strings are more likely to contain misspellings or entirely different representations.

At 335, a first numerical score is calculated in accordance with Equation 7, as follows:

$$NS_1 = WS_{LEV} + WS_{LCS} \qquad (7)$$

Wherein the first numerical score, $NS_1$, comprises the sum of the weighted Levenshtein score, $WS_{LEV}$, and the weighted largest common substring score, $WS_{LCS}$.

At 340, an acronym score ($S_{ACR}$) of the first and second strings is calculated. In one implementation, acronyms of the first and second strings are formed. The first and second acronyms are then compared. If the acronyms are equal than a non-zero score is given, if the acronyms are not equal than a score of zero is given. The acronym score is adapted to rule out a false positive (e.g., GM—General Motors and GE—General Electric) as indicted by the Levenshtein score and/or largest common substring score.

At 345, a weighted acronym score is calculated in accordance with Equation 8, as follows:

$$WS_{ACR} = W_{ACR} * S_{ACR} \quad (8)$$

Wherein the weighted acronym score, $WS_{ACR}$, comprises a product of the acronym score, $S_{ACR}$, and an acronym weight factor, $W_{ACR}$. In one implementation, the acronym weight factor, $W_{ACR}$, is substantially between 0.1 and 0.4, with an exemplary value of 0.2.

At 350, a weighted Levenshtein/largest common substring score (e.g., weighted first numerical score) is calculated in accordance with Equation 9, as follows:

$$WS_{LEV-LCS} = W_{LEV-LCS} * (W_{LEV} * S_{LEV} + W_{LCS} * S_{LCS}) \quad (9)$$

Wherein the weighted Levenshtein/largest common substring score, $WS_{LEV-LCS}$, comprises a product of the first numerical score and a Levenshtein/largest common substring weight factor, $W_{LEV-LCS}$. In one implementation, the Levenshtein/largest common substring weight factor, $W_{LEV-LCS}$, is substantially between 0.6 and 0.9, with an exemplary value of 0.8.

At 355, a second numerical score is calculated in accordance with Equation 10, as follows:

$$NS_2 = WS_{LEV-LCS} + WS_{ACR} \quad (10)$$

Wherein the second numerical score, $NS_2$, comprises the sum of the weighted Levenshtein/largest common substring score (e.g., first numerical score), $WS_{LEV-LCS}$, and the weighted acronym score, $WS_{ACR}$. In one implementation, a sum of the Levenshtein/largest common substring weight factor ($W_{LEV-LCS}$) and acronym weight factor ($W_{ACR}$) is equal to one.

The second numerical score is adapted to represent a similarity between a first and second string, which are comprised of characters, or characters and numbers. However, the in the case of a first and second numerical strings, the acronym score is not normally applicable. Therefore, the first numerical score is adapted to represent a similarity between a first and second string, which are comprised of numbers. Accordingly, the method may optionally include determining if the first and second strings are character-type strings (e.g., comprised of characters, or characters and numbers) or numerical-type strings (e.g., comprised of numbers), at 330. If the first and second strings are numerical-type strings, the first numerical score calculated at 335 is utilized. If the first and/or second strings are character-type strings, the second numerical score calculated according to 355 is utilized.

Referring now to FIGS. 4A-4H, an exemplary computer implemented method of determining a similarity of a first string and a second string, in accordance with an exemplary embodiments of the present invention, is shown. As depicted in FIGS. 4A and 4B, a method of calculating a Levenshtein distance of a first string and a second string is implemented by the software code. As depicted in FIGS. 4C and 4D, a method of calculating a largest common substring from a Levenshtein matrix is implemented by the software code. As depicted in FIGS. 4E and 4F, a method of calculating an acronym score is implemented by the software code. As depicted in FIGS. 4G and 4H, a method of calculating a consolidated Levenshtein, largest common substring, and acronym score is implemented by the software code.

Figure 5:
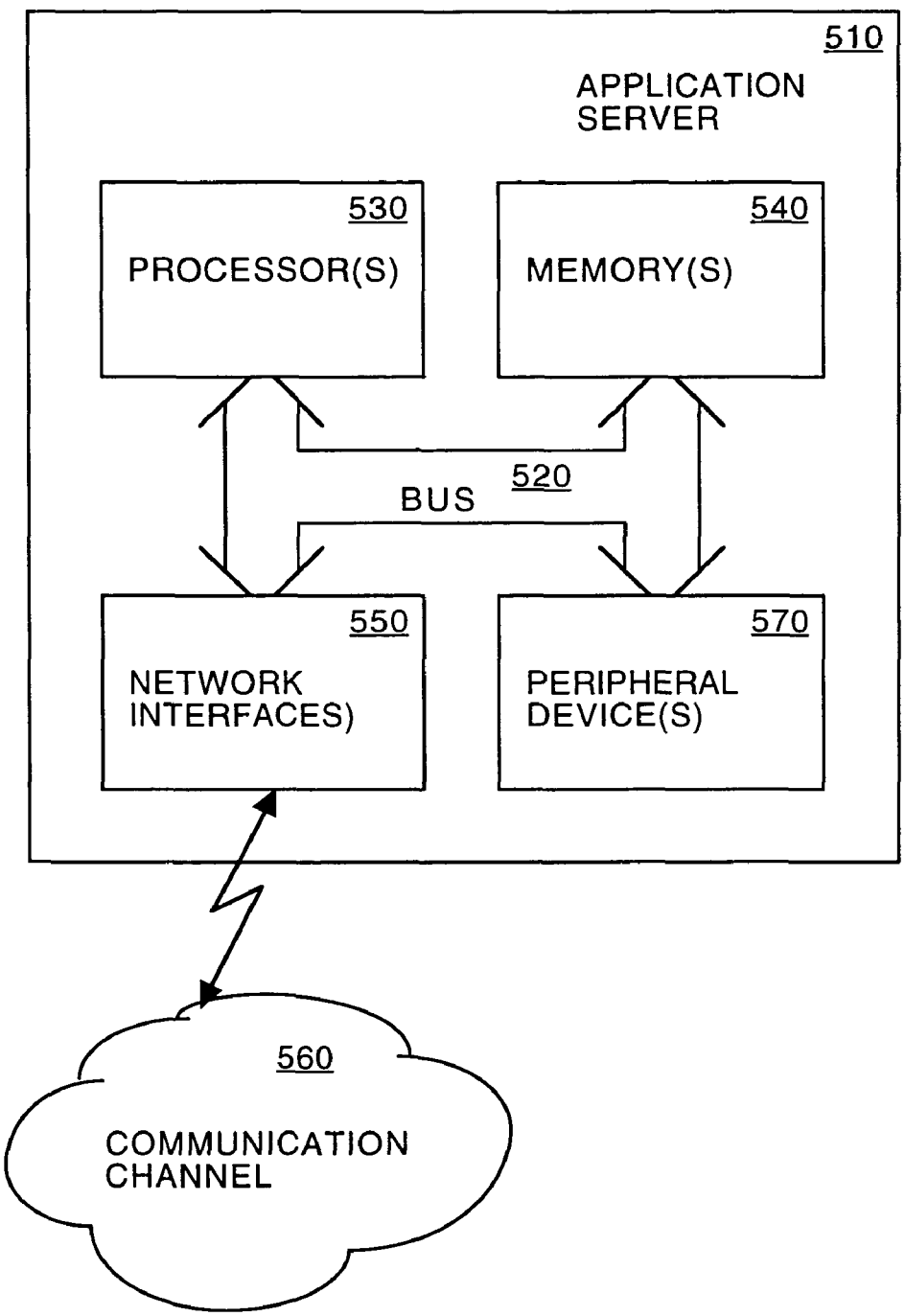
FIG. 5 shows an exemplary computing device for implementing embodiments of the present invention.

Referring now to FIG. 5, an exemplary computing device for implementing embodiments of the present invention is shown. As depicted in FIG. 5, the computing device 510 comprises an address/data bus 520 for communicating information and instructions. One or more processors 530 are coupled with the bus 520 for processing information and instructions. One or more memories 540 are also coupled to the bus 520 for storing information and instructions for the processor(s) 530. The memory 540 may include volatile memory (e.g. random access memory, static RAM, dynamic RAM, and the like), non-volatile memory (e.g. read only memory, programmable ROM, flash memory, EPROM, EEPROM, and the like), mass data storage (e.g. hard disk, optical disk, floppy disk, and the like), and the like.

Optionally, the computing device 510 may further comprise one or more peripheral devices 570 (e.g., mass data storage device, display, keyboard, pointing device, speaker, and the like) coupled to the bus 520. The peripheral devices 570 may provide for inputting and output information and instructions. The computing device 510 may also comprise one or more network interface(s) 550 are also coupled to the bus 520. The network interface 550 provides for communicating with other computing devices across one or more communication channels 560.

Certain elements of the present invention are realized as one or more sequences of instructions (e.g., software code) that reside on a computer-readable medium, such as the memory 540, and are executed by the processor 530. When executed, the information and instructions causes the processor 530 to implement a method of determining a Levenshtein distance for a first and second string utilizing a Levenshtein matrix. The method further comprises determining a largest common substring from the Levenshtein matrix.

When executed, the one or more sequences of instructions may also cause the processor 530 to implement a method of determining a numerical score indicative of the similarity between the first and second strings. In one implementation, the numerical score comprises a consolidated Levenshtein and largest common substring score. In another implementation, the numerical score comprises a consolidated Levenshtein, largest common substring and acronym score.

Accordingly, embodiments of the present invention advantageously combine the Levenshtein distance heuristic and the largest common substring heuristic to reduce the number of computations performed to obtain both heuristics. Thus, reducing the total run time by approximate one half, as compared to calculating the Levenshtein distance heuristic and the largest common substring heuristic separately according to the conventional art. Embodiments of the present invention also advantageously reduce the occurrence of a false positive determination of the similarity between two strings.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer-implemented method comprising:
calculating, by a processor of the computer, a Levenshtein matrix of a first string and a second string;
determining a Levenshtein distance from said Levenshtein matrix;
determining a longest diagonal of equal hamming distance within the Levenshtein matrix;
determining a substring corresponding to the longest diagonal within said Levenshtein matrix, the substring being the largest common substring of the first and second strings;
calculating a Levenshtein score as a function of said Levenshtein distance;
calculating a largest common substring score as a function of said largest common substring;
storing at least one of: the Levenshtein matrix, the Levenshtein distance, the largest common substring, the Levenshtein score, and the largest common substring score in a computer-readable storage medium;
determining a similarity between said first string and said second string as a function of said Levenshtein score and said largest common substring score; and
based upon said similarity, automating at least one of data entry for a database, processing within a database, or reporting from a database, the database including at least one of said first or second strings.

2. The method according to claim 1, further comprising calculating an acronym score of said first string and said second string.

3. The method according to claim 2, further comprising calculating a weighted acronym score comprising a product of said acronym score and an acronym weight factor.

4. The method according to claim 1, further comprising:
calculating a weighted Levenshtein score comprising a product of said Levenshtein score and a Levenshtein weight factor;
calculating a weighted largest common substring score comprising a product of said largest common substring score and a largest common substring weight factor; and
calculating a Levenshtein/largest common substring score comprising a sum of said weighted Levenshtein score and said weighted largest common substring score.

5. The method according to claim 4, wherein a sum of said Levenshtein weight factor and said largest common substring weight factor is equal to one.

6. The method according to claim 4, further comprising calculating a first weighted numerical score comprising a product of said Levenstein/largest common substring score and a string weight factor.

7. The method according to claim 6, further comprising:
calculating an acronym score of said first string and said second string;
calculating a weighted acronym score comprising a product of said acronym score and an acronym weight factor; and
calculating a second weighted numerical score comprising a sum of said first weighted numerical score and said weighted acronym score.

8. The method according to claim 7, wherein a sum of said string weight factor and said acronym weight factor is equal to one.

9. A computer-readable storage medium containing one or more sequences of executable instructions which cause a computing device to implement a method for determining a similarity comprising:
calculating a Levenshtein matrix of a first string and a second string;
determining a Levenshtein distance from said Levenshtein matrix;
determining a longest diagonal of equal hamming distance within the Levenshtein matrix;
determining a substring corresponding to the longest diagonal within said Levenshtein matrix, the substring being the largest common substring of the first and second strings;
calculating a Levenshtein score as a function of said Levenshtein distance;
calculating a largest common substring score as a function of said largest common substring;
storing at least one of: the Levenshtein matrix, the Levenshtein distance, the largest common substring, the Levenshtein score, and the largest common substring score in a computer-readable storage medium;
calculating a first numerical score as a function of said Levenshtein score and said largest common substring score; and
based upon said similarity, automating at least one of data entry for a database, processing within a database, or reporting from a database, the database including at least one of said first or second strings.

10. The computer-readable medium according to claim 9, wherein calculating said Levenshtein score comprises:
subtracting the resultant of dividing said Levenshtein distance by an average of a length of said first string and a length of said second string from one.

11. The computer-readable medium according to claim 9, wherein calculating said largest common substring score comprises:
determining a length of said largest common substring from said Levenshtein matrix; and
dividing said length of said largest common substring by an average of a length of said first string and a length of said second string.

12. The computer-readable medium according to claim 9, wherein calculating said first numerical score comprises:
calculating a weighted Levenshtein score comprising a product of said Levenshtein score and a Levenshtein weight factor;
calculating a weighted largest common substring score comprising a product of said largest common substring score and a largest common substring weight factor; and
summing said weighted Levenshtein score and said weighted largest common substring score.

13. The computer-readable medium according to claim 9, further comprising:
calculating an acronym score;
calculating a second numerical score as a function of said first numerical score and said acronym score; and
further automating at least one of said data entry, processing or reporting based upon said second numerical score.

14. The computer-readable medium according to claim 13, wherein calculating said second numerical score comprises:
calculating a weighted Levenshtein score comprising a product of said Levenshtein score and a Levenshtein weight factor;
calculating a weighted largest common substring score comprising a product of said largest common substring score and a largest common substring weight factor;
calculating a Levenshtein/largest common substring score comprising a sum of said weighted Levenshtein score and said weighted largest common substring score;

calculating a weighted Levenshtein/largest common substring score comprising a product of said Levenshtein/largest common substring score and a Levenshtein/largest common substring weight factor;

calculating a weighted acronym score comprising a product of said acronym score and an acronym score weight factor; and summing said weighted Levenshtein/largest common substring score and said weighted acronym score.

15. The computer-readable medium according to claim 14, further comprising:

utilizing said first numerical score for automating said at least one of data entry, processing or reporting, when said first string and said second string comprise numerical-type strings; and utilizing said second numerical score for automating said at least one of data entry, processing or reporting, when said first string or said second string comprise character-type strings.

* * * * *

UNITED STATES PATENT AND TRADEMARK OFFICE
CERTIFICATE OF CORRECTION

PATENT NO.        : 7,653,621 B2                                      Page 1 of 1
APPLICATION NO.   : 10/632190
DATED             : January 26, 2010
INVENTOR(S)       : Muthu Senthil It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 519 days.

On the Title page, in field (57), in column 2, in "Abstract", line 6, delete "farther" and insert -- further --, therefor.

In column 3, line 17, delete "As" and insert -- as --, therefor.

In column 7, line 50, in claim 6, delete "Levenstein/largest" and insert -- Levenshtein/largest --, therefor.

Signed and Sealed this

Twenty-first Day of September, 2010

David J. Kappos
*Director of the United States Patent and Trademark Office*